(12) United States Patent
Yuan et al.

(10) Patent No.: US 11,790,655 B2
(45) Date of Patent: Oct. 17, 2023

(54) VIDEO SAMPLING METHOD AND APPARATUS USING THE SAME

(71) Applicant: SAMSUNG ELECTRONICS CO., LTD., Suwon-si (KR)

(72) Inventors: Jiahui Yuan, Beijing (CN); Wei Wen, Beijing (CN); Jianhua Fan, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 17/136,368

(22) Filed: Dec. 29, 2020

(65) Prior Publication Data

US 2021/0201043 A1 Jul. 1, 2021

(30) Foreign Application Priority Data

Dec. 30, 2019 (CN) .......................... 201911392891.9

(51) Int. Cl.
*G06K 9/00* (2022.01)
*G06K 9/62* (2022.01)
*G06V 20/40* (2022.01)
(Continued)

(52) U.S. Cl.
CPC ............ *G06V 20/46* (2022.01); *G06F 18/214* (2023.01); *G06V 10/454* (2022.01); *G06V 10/82* (2022.01);
(Continued)

(58) Field of Classification Search
CPC .. G06K 9/6256; G06K 9/6262; G06V 10/454; G06V 10/82; G06V 20/41; G06V 20/44; G06V 20/46; G06V 40/20; G06V 10/764; G06V 20/49; G06V 10/25; G06V 20/04; G06V 20/47; G06T 2207/10016; G06T 2207/20016; G06T 2207/20076; G06T 2207/20084; G06T 7/277;
(Continued)

(56) References Cited

U.S. PATENT DOCUMENTS 9,542,621 B2 1/2017 He et al.
2006/0139458 A1 6/2006 Chou
(Continued)

FOREIGN PATENT DOCUMENTS

CN 105225248 B 2/2018
KR 10-1477649 B1 12/2014
(Continued)

OTHER PUBLICATIONS

Tube Convolutional Neural Network (T-CNN) for Action Detection in Videos Rui Hou, Chen Chen, Mubarak Shah; Proceedings of the IEEE International Conference on Computer Vision (ICCV), 2017, pp. 5822-5831 (Year: 2017) (Year: 2017).*
(Continued)

*Primary Examiner* — Michael J Vanchy, Jr.
(74) *Attorney, Agent, or Firm* — Sughrue Mion, PLLC

(57) ABSTRACT

A video sampling method, including sampling a video based on a sampling window to obtain a current sequence of sampled images; acquiring action parameters corresponding to the current sequence of sampled images; adjusting the sampling window according to the action parameters; and sampling the video based on the adjusted sampling window.

11 Claims, 21 Drawing Sheets

(51) Int. Cl.
  *G06F 18/214* (2023.01)
  *G06V 10/82* (2022.01)
  *G06V 10/44* (2022.01)
  *G06V 40/20* (2022.01)

(52) U.S. Cl.
  CPC ............. *G06V 20/41* (2022.01); *G06V 20/44* (2022.01); *G06V 40/20* (2022.01)

(58) Field of Classification Search
  CPC ...... G06T 7/74; G06N 3/0454; G06N 3/0481; G06N 3/08
  See application file for complete search history.

(56) References Cited

U.S. PATENT DOCUMENTS

| | | | |
|---|---|---|---|
| 2011/0157416 | A1 | 6/2011 | Chen |
| 2019/0102908 | A1* | 4/2019 | Yang ................. G06V 10/82 |
| 2020/0205697 | A1* | 7/2020 | Zheng ................. G08B 21/043 |

FOREIGN PATENT DOCUMENTS

| | | |
|---|---|---|
| KR | 10-1676176 B1 | 11/2016 |
| KR | 10-2021441 B1 | 11/2019 |

OTHER PUBLICATIONS

N. Li, H. -W. Guo, Y. Zhao, T. Li and G. Li, "Active Temporal Action Detection in Untrimmed Videos via Deep Reinforcement Learning," in IEEE Access, vol. 6, pp. 59126-59140, 2018, doi: 10.1109/ACCESS.2018.2872759. (Year: 2018).*

Xiong Y, Zhao Y, Wang L, Lin D, Tang X. A pursuit of temporal accuracy in general activity detection. arXiv preprint arXiv: 1703.02716. Mar. 8, 2017. (Year: 2017).*

Communication dated Apr. 1, 2021, issued by the International Searching Authority in counterpart International Application No. PCT/KR2020/019106 (PCT/ISA/220, 210, 237).

* cited by examiner

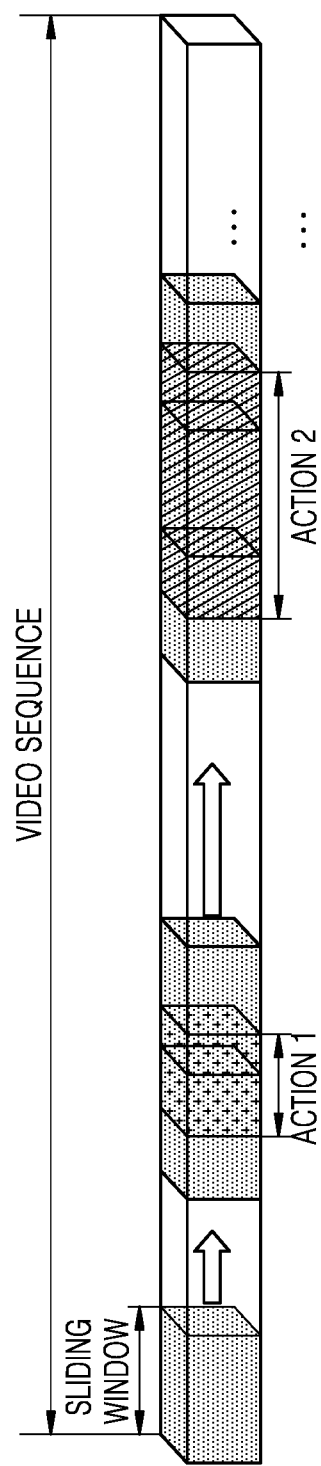

VIDEO SAMPLING METHOD AND APPARATUS USING THE SAME

CROSS-REFERENCE TO RELATED APPLICATION

This application is based on and claims priority under 35 U.S.C. § 119 to Chinese Patent Application No. 201911392891.9, filed on Dec. 30, 2019, in the Chinese Intellectual Property Office, the disclosure of which is incorporated by reference herein in its entirety

BACKGROUND

1. Field

The disclosure relates to a technical field of video processing. More specifically, the disclosure relates to a video sampling method and an apparatus using the same.

2. Description of Related Art

Behavior and action recognition for video has abundant applications such as intelligent human-computer interaction, smart video clipping and editing, and so on.

In an application of an active perception of an intelligent robot, existing robots can only interact with people in a passive way by voice. Giving the robot an ability of recognizing human actions is a key technology for the robot to perceive, imitate and then understand human behaviors, which may be an important foundation for the development of robots in the future. In an application of a driver and passenger monitoring system in an autonomous car, behavioral analysis of the driver and passengers is an important component in automatic driving, which may implement the monitoring for abnormal behaviors of the driver and behavior characteristic analysis for the driver and the passenger, and then an intelligent and personalized in-car perception and interaction system can be implemented.

With the development of the mobile network, the video gradually becomes a new information sharing and spreading media, and recognizing and locating behaviors and actions of people in the video may implement functions such as automatic wonderful action edition, slow-motion playback, action special effect edition and the like.

SUMMARY

Provided are a video sampling method and an apparatus, to optimize existing video sampling methods.

Additional aspects will be set forth in part in the description which follows and, in part, will be apparent from the description, or may be learned by practice of the presented embodiments.

In accordance with an aspect of the disclosure, a video sampling method includes sampling a video based on a sampling window to obtain a current sequence of sampled images; acquiring action parameters corresponding to the current sequence of sampled images; adjusting the sampling window according to the action parameters; and sampling the video based on the adjusted sampling window.

The action parameters may include a probability that an action is contained in the current sequence of sampled images, and a completeness of the action.

The acquiring of the action parameters may further include: performing feature extraction on the current sequence of sampled images to obtain a feature of the current sequence of sampled images; and performing feature recognition on the feature to obtain the action parameters.

The action parameters may include a probability of that an action is contained in the current sequence of sampled images, and a completeness of the action, and the performing of the feature recognition may further include: performing action recognition on the feature to obtain the probability; and performing action completeness degree recognition on the feature to obtain the completeness.

The adjusting of the sampling window may further include: calculating a change value in a size of the sampling window and a shifted position of the sampling window according to the action parameters; and adjusting the sampling window based on the change value and the shifted position.

Thee calculating of the change value and the shifted position may further include: based on determining that an action contained in the current sequence of sampled images is not finished according to the action parameters, calculating an incremental size of the sampling window according to the action parameters; and determining the shifted position according to the incremental size.

The video sampling method may further include performing smoothing processing on the incremental size according to historical adjustment information of the sampling window.

The determining the shifted position may further include: determining a number of frames of sampled increased images in an increased window corresponding to the incremental size according to the incremental size; and determining the shifted position according to the determined number of frames.

The sampling of the video based on the adjusted sampling window may further include: sampling the video using the increased window according to the determined number of frames to obtain a sequence of increased images; acquiring an adjusted sequence of sampled images corresponding to the adjusted sampling window from the current sequence of sampled images; and using the adjusted sequence of sampled images and the sequence of increased images as a new sequence of sampled images obtained based on the adjusted sampling window.

The video sampling method may further include selecting a candidate action having a highest probability from among candidate actions included in the current sequence of sampled images as the action; when the probability is greater than a first threshold, and the completeness is greater than a second threshold, determining that the action is finished; when the probability less than a third threshold, and the completeness less than a fourth threshold, determining that the current sequence of sampled images does not contain the action; and when the probability is between the first threshold and the third threshold, and the completeness is between the second threshold and the fourth threshold, determining that the action is not finished.

The calculating of the change value may further include: when it cannot be determined whether the action is finished according to the action parameters, calculating a subtraction value of the sampling window according to the action parameters; and determining the shifted position according to the subtraction value of the sampling window.

The determining of the shifted position may further include: subtracting a window having a length based on the subtraction value from two ends of the sampling window, to obtain a first sampling window and a second sampling window; using one of the first sampling window and the second sampling window as an updated sampling window; and determining the shifted position according to the updated sampling window.

The using of the one of the first sampling window and the second sampling window may further include: sampling a first sequence from the first sampling window and a second sequence the second sampling window, wherein each of the first sequence and the second sequence include a preset number of frames of sampled images, performing feature extraction and performing feature recognition on the first sequence and the second sequence; and selecting one of the first sampling window and the second sampling window as the updated sampling window according to a result of the feature recognition.

The shifted position of the sampling window may correspond to a starting point of the sampling window.

In accordance with an aspect of the disclosure, a video sampling apparatus includes a memory and at least one processor coupled to the memory and configured to implement: a first sampling unit configured to sample a video based on a sampling window to obtain a current sequence of sampled images; a parameter acquiring unit configured to acquire action parameters corresponding to the current sequence of sampled images; a window adjustment unit configured to adjust the sampling window according to the action parameters in order to sample the video based on the adjusted sampling window; and a second sampling unit configured to sample the video based on the adjusted sampling window.

BRIEF DESCRIPTION OF DRAWINGS

The above and other purposes and features of certain embodiments of the present disclosure will be more apparent from the following description taken in conjunction with the accompanying drawings, in which:

FIG. 1D shows a schematic diagram of sliding a window to recognize actions in a video according to an embodiment;

DETAILED DESCRIPTION

Figure 1A:
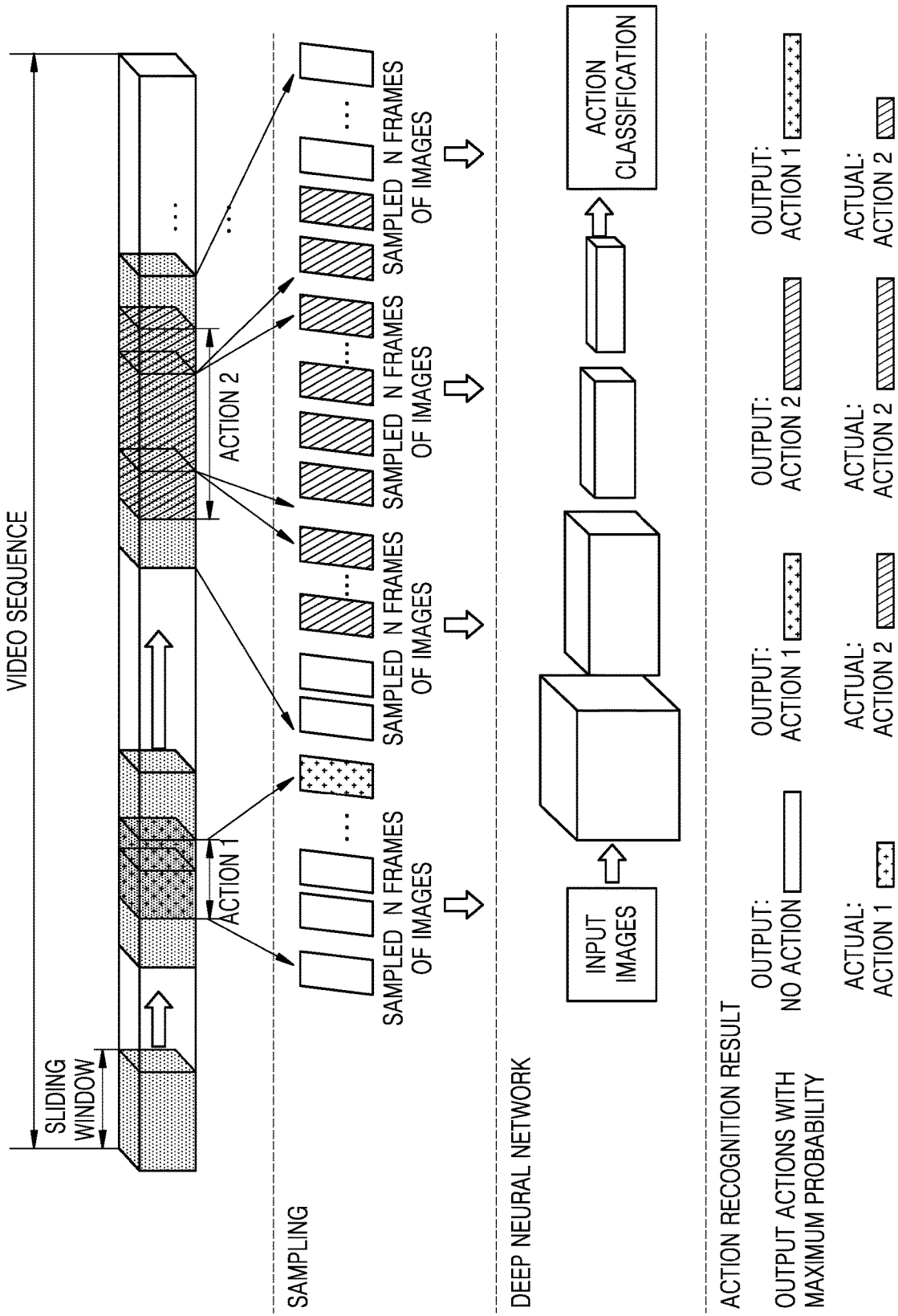
FIG. 1A shows a schematic diagram of recognizing actions in a video according to an embodiment.

Exemplary embodiments of the disclosure, an example of which is illustrated in the accompany drawings, will now be referred to in detail, wherein the same reference numeral indicates the same part throughout the accompany drawings. The embodiments will be illustrated below with reference to the accompanying drawings.

As shown in FIG. 1A, in order to recognize actions in a video, firstly the video may be sampled, and certain frames of images in the video (corresponding to a video sequence in FIG. 1A) may be sampled as input information of an action recognition algorithm. In related art, sampling is performed by a window, for example a sliding window, with a fixed time length, and a fixed number, such as N frames, of images are sampled in the fixed window for the recognition of behaviors and actions. Then the window is moved forward by a fixed time step length, and in a video clip corresponding to a new window area, a fixed number of images are sampled for a new round of action recognition. In FIG. 1A, the action recognition may be performed by using a deep neural network. For example, for N frames of images obtained by each sampling, they may be input into the deep neural network as input images, respectively, to obtain an action classification result. According to the action classification result respectively corresponding to the N frames of images obtained by each sampling, the action recognition result shown in FIG. 1A may be obtained, and the N frames of images obtained by each sampling may obtain a recognized action with a maximum probability. For example, in FIG. 1A, based on the sliding window, the action recognition result of the N frames of images obtained by a first sampling is "no action", the action recognition result of the N frames of images obtained by a second sampling is "Action 1", the action recognition result of the N frames of images obtained by a third sampling is "Action 2" and the action recognition result of the N frames of images obtained by a fourth sampling is "Action 1".

Fixed size and fixed step length of the sampling window cannot satisfy the needs of high-precision recognition of actions with different lengths, which may cause the sampling window for short actions to include a large amount of noise and cause long actions to be cut off into multiple windows, which may result in low action recognition precision. For example, in FIG. 1A, based on the sliding window, the actual action corresponding to the N frames of images obtained by the first sampling is "Action 1", the actual action corresponding to the N frames of images obtained by the second sampling is "Action 2", the actual action corresponding to the N frames of images obtained by the third sampling is "Action 2", and the actual action corresponding to the N frames of images obtained by the fourth sampling is "Action 2".

Figure 1B:
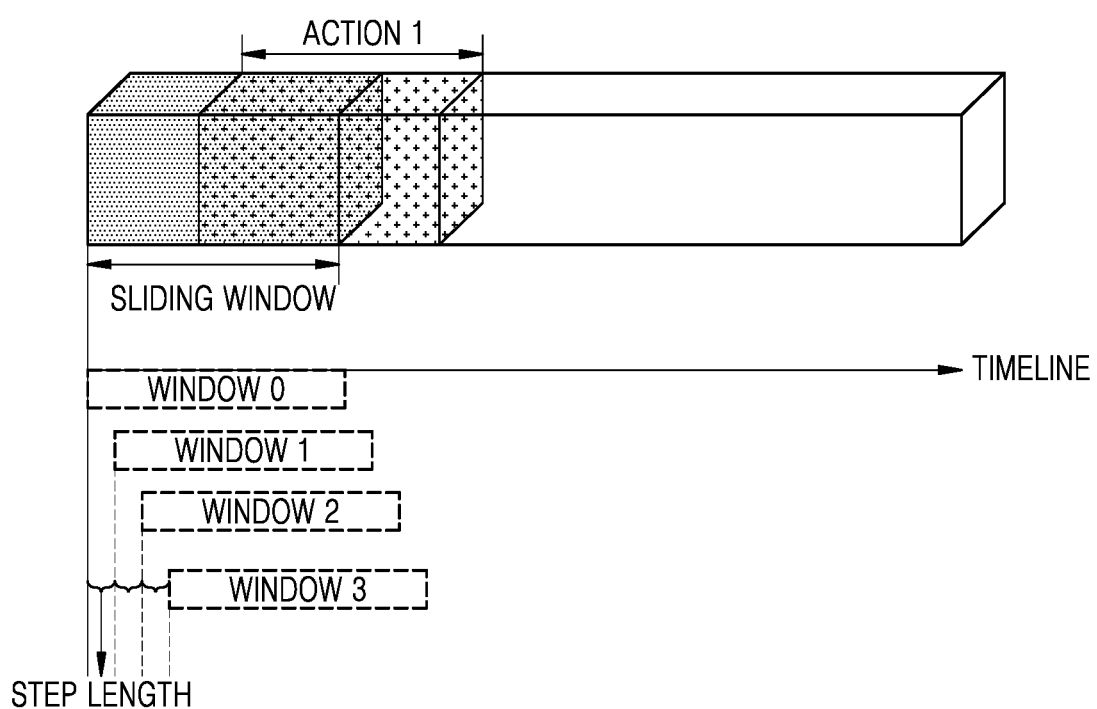
FIG. 1B shows a schematic diagram of moving a window by a small step length according to an embodiment.

Moving the sampling window with a very small step length may improve video dips that contain relatively more other actions or no actions in the window to a certain extent. Such video clips are called background noise for target actions that need to be recognized. As shown in FIG. 1B, by moving the window with a small step length, window 3 contains less background noise than window 0, and an action recognition effect thereof is better.

However, this may result in a large amount of redundant computation due to a large amount of overlap between adjacent sampling windows, which may cause the same information to be computed for multiple times to obtain the accurate recognition result, resulting in a large amount of computation redundancy, which may not satisfy the needs of quick recognition of behaviors and actions.

Figure 1C:
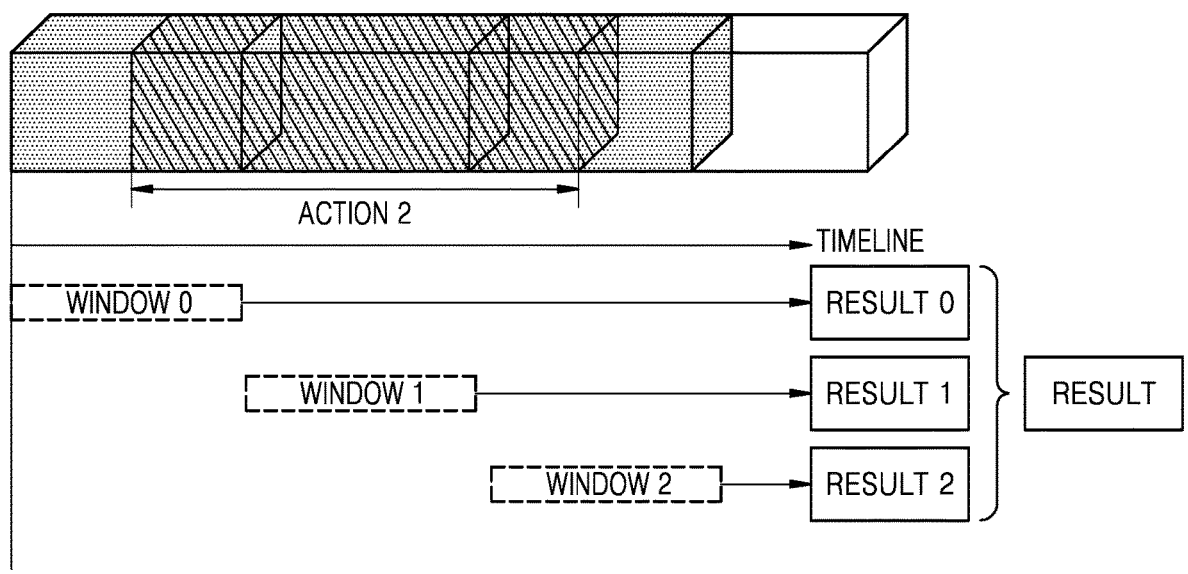
FIG. 1C shows a schematic diagram of obtaining a final recognition result by synthesizing results of multiple windows according to an embodiment.

With respect to the problem that the long action is cut off, the related art may perform judgment by synthesizing results of multiple windows, as shown in FIG. 1C. However, the problem of this method is that a single window can only receive fragment information, and accordingly the precision of the result thereof may be very low. For a long action, the fragment action thereof may be recognized as another action, so that multiple wrong results are synthesized in this way, and the precision thereof may be very poor. Moreover, durations of different actions are not the same, and it may be difficult to determine to a number of results of windows to be specifically synthesize either.

The problem of the related art described above may relate to two aspects:

(1) The size of the window is fixed, causing the behavior & action recognition to be inaccurate.

In the real world, the durations of different human behaviors and actions also vary greatly, and it is difficult to choose the size of the window when sampling with the fixed window size.

When the window is too small, the action with a long duration is cut off into several windows, such as Action 2 in FIG. 1D. For each window, the process of the inconsistency of the action cannot be completely contained, which may result in low recognition precision. For a walking action with a relatively long duration, when it is cut off into the short window, it is difficult to distinguish the walking action from other still standing actions.

When the window is too large, the action with a short duration may be mixed with relatively more background actions and other actions in one window, for example, two sampling windows of Action 1 in FIG. 1D both contain a large amount of backgrounds, which may also result in low recognition precision. For example, as for a clutch shooting action with very short duration in an athletic contest, if it is cut off into different windows, it would be difficult to accurately recognize the shooting action due to interference of background actions such as running, jumping and the like.

(2) The moving step length of the window is fixed, causing the behavior & action recognition to be inaccurate.

Moving the window with a fixed step length makes it difficult to ensure that the starting point of the window is the same as the starting point of the action, so it will contain relatively more noise in sampled data, and in the real world, frequency of occurrence of the action cannot be estimated, and it is also very difficult to set the size of the step length. If the step length is relatively large, the window may contain relatively more background noise, thereby affecting the behavior & action recognition precision. If the step size is relatively small, the previously and subsequently sampled windows may largely overlap with each other, thereby causing repetition of data between multiple samples, resulting in redundant computation for subsequent behavior action recognition, so that recognition cannot be performed quickly and efficiently.

Figure 1E:
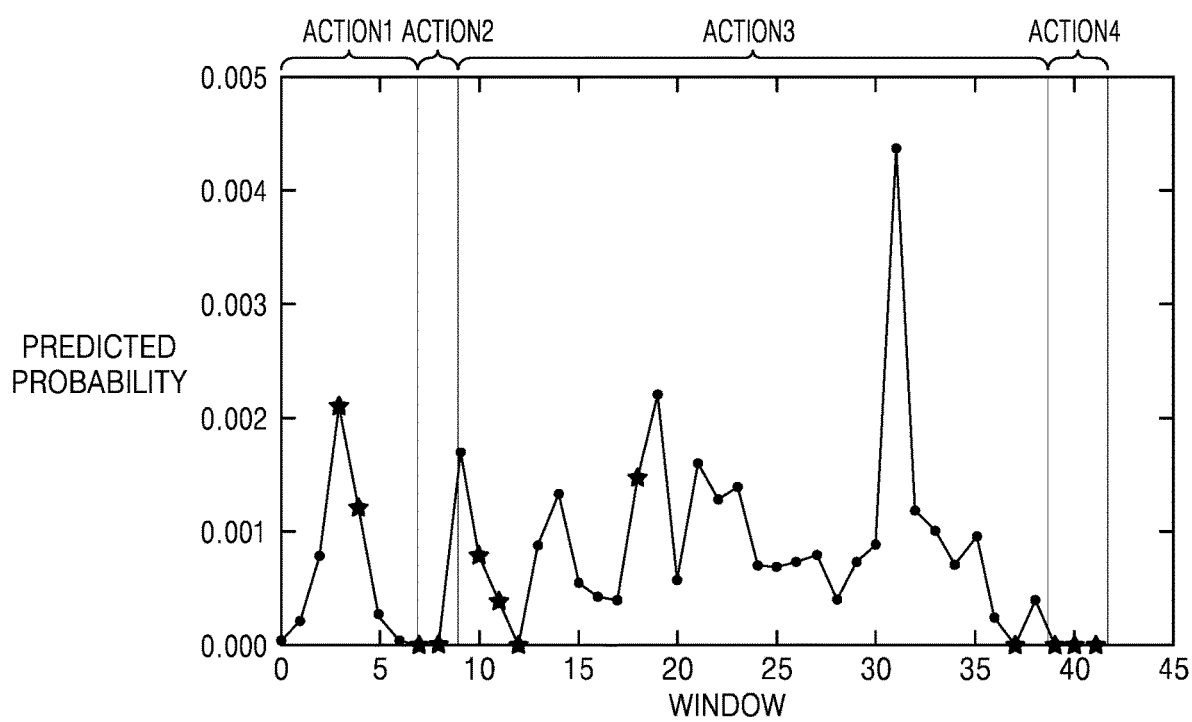
FIG. 1E shows a result of using a video containing four actions for experimentation according to an embodiment.

For the behavioral action recognition, it is desirable that the sampling window correctly covers the entire process of the action. If the sampling window is adjusted to cover the entire process of the action, the accuracy of the action recognition and classification is high; and if the sampling window is adjusted not to cover the entire process of the action, the accuracy of the action recognition and classification is low. As shown in FIG. 1E, a video containing four actions is taken as an example, action classification is performed with a sampling window having a length of 1 s, points represented by asterisks in FIG. 1E are windows with correct recognitions, points represented by solid circles are windows with wrong recognitions, and the accuracy by statistics is only 28.57%. However, if the sampling window is adjusted to cover the entire process of the action, the accuracy thereof is 100%. Accordingly, for the behavioral action recognition, it is desirable that the sampling window correctly covers the entire process of the action.

Figure 1F:
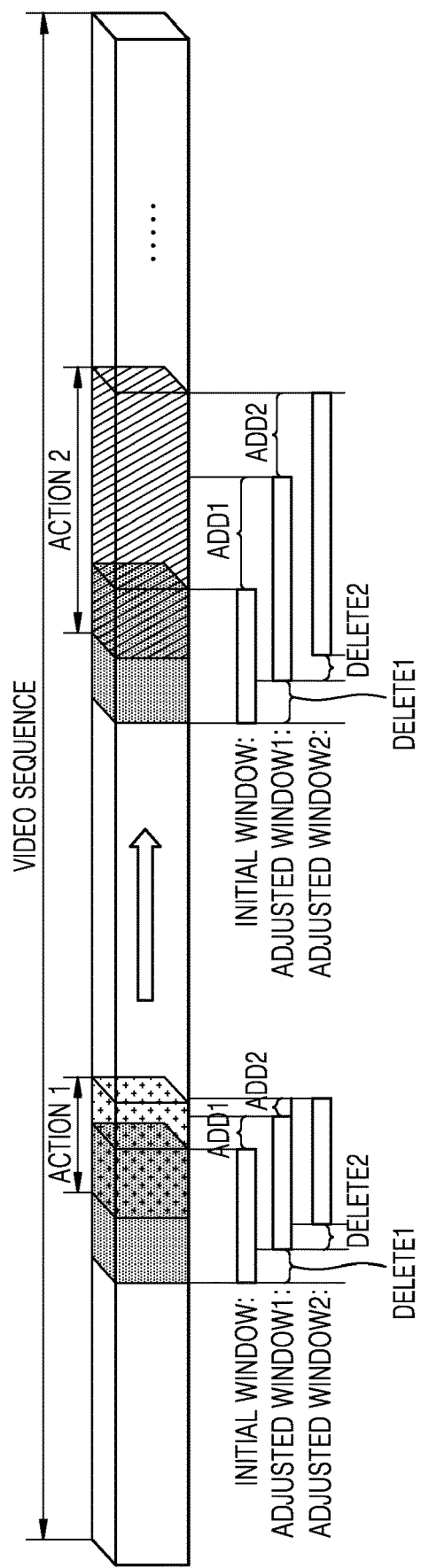
FIG. 1F shows a schematic diagram of recognizing actions in a video according to an embodiment.

In an exemplary embodiment of the disclosure, as shown in FIG. 1F, completeness of the ongoing action may be obtained using, for example, an artificial intelligence (AI) model, and a size and a position of the sampling window are adjusted according to the completeness. For example, with respect to Action 1 or Action 2, additional windows (corresponding to Add 1 and Add 2 in FIG. 1F) of different sizes are dynamically added according to the completeness of Action 1 or Action 2 in the sampling window, and the previous window is automatically deleted based on the size of the sampling window, so that the adjusted sampling window contains completed Action 1 or Action 2, and the final window contains the complete action process, and the high-precision of behavior & action recognition and positioning is achieved.

Figure 2:
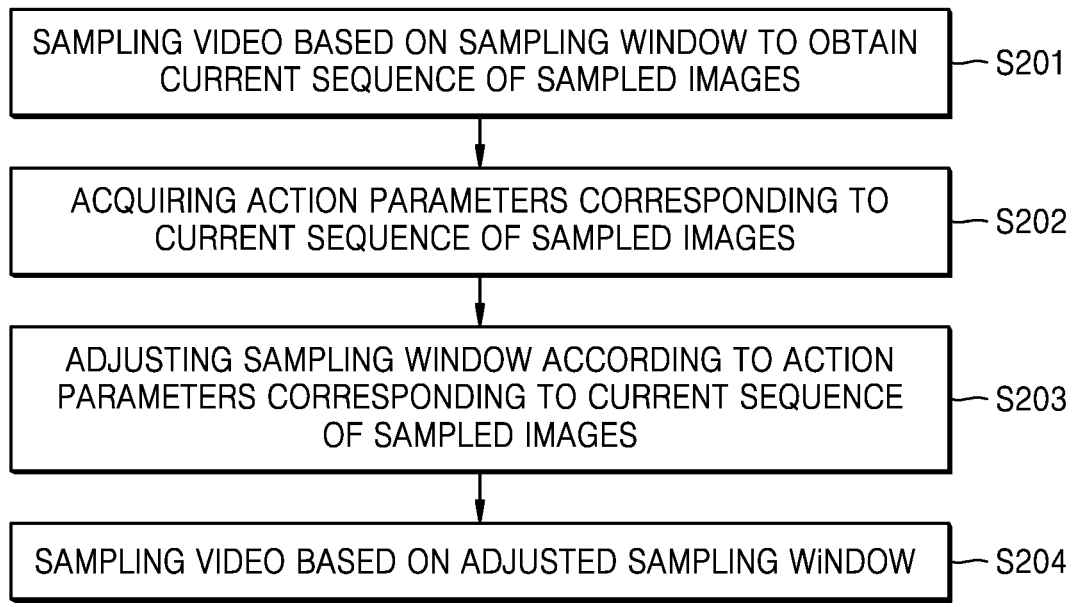
FIG. 2 shows a flowchart of a video sampling method according to an embodiment.

FIG. 2 shows a flowchart of a video sampling method according to an exemplary embodiment of the disclosure. Referring to FIG. 2, in operation S201, a video is sampled based on a sampling window to obtain a current sequence of sampled images. Herein, the size of the sampling window may be adjusted according to the length of the action.

In operation S202, action parameters corresponding to the current sequence of sampled images are obtained. Herein, the action parameters may include a probability of containing an action in the current sequence of sampled images and/or completeness of the contained action.

In an exemplary embodiment of the disclosure, when acquiring the action parameters corresponding to the current sequence of sampled images, a feature extraction may be firstly performed on the current sequence of sampled images to obtain the feature of the current sequence of sampled images, and then feature recognition may be performed on the feature of the current sequence of sampled images to obtain the action parameters in the current sequence of sampled images.

For example, the feature extraction may be performed on the current sequence of sampled images through feature extraction algorithms such as Histogram Of Oriented Gradient (HOG), Scale-Invariant Features Transform (SIFT), Speeded Up Robust Features (SURF), Difference Of Gaussian (DOG), Local Binary Pattern (LBP), Haar-Like (HAAR) features, and features extracted by a deep neural network, for example a combination of multi-frame image features extracted by a two-dimensional deep neural network or features of the image sequence directly extracted by a three-dimensional neural network.

In an exemplary embodiment of the application, feature recognition is performed on the feature of the current sequence of sampled images to obtain the action parameters in the current sequence of sampled images. Herein, the action parameters may refer to feature parameters related to the action recognized from the image feature, for example, an action probability and an action completeness may be included. The action probability may refer to a probability of containing an action in the current sequence of sampled images, and the action completeness may refer to the completeness of the action contained in the current sequence of sampled images.

In an exemplary embodiment of the disclosure, the action parameters may include a probability of containing an action in the current sequence of sampled images and the completeness of the contained action. When performing feature recognition on the feature of the current sequence of sampled images, perform action recognition may first be performed on the feature of the current sequence of sampled images to obtain a probability of containing an action in the current sequence of sampled images, and then recognition of an action completeness degree may be performed on the feature of the current sequence of sampled images to obtain the completeness of the action contained in the current sequence of sampled images.

In an exemplary embodiment of the disclosure, an action with the highest probability contained in the current sampled image sequence may be selected from various actions as the action contained in the current sampled image sequence; when the probability of containing the action in the current sequence of sampled images is greater than a first threshold, and the completeness of the action contained in the current sequence of sampled images is greater than a second threshold, it may be determined that the action contained in the current sequence of sampled images is finished; and/or, when the probability of containing the action in the current sequence of sampled images is less than a third threshold, and the completeness of the action contained in the current sequence of sampled images is less than a fourth threshold, it may be determined that the current sequence of sampled images does not contain an action; and/or, when the probability of containing the action in the current sequence of sampled images is between the first threshold and the third threshold, and the completeness of the action contained in the current sequence of sampled images is between the second threshold and the fourth threshold, it may be determined that the action contained in the current sequence of sampled images is not finished.

In an exemplary embodiment of the disclosure, when performing action recognition on the feature of the current sequence of sampled images, firstly perform three dimensional (3D) linear gating processing may first be performed on the feature of the current sequence of sampled images to obtain an action recognition feature, and then the probability of containing the action in the current sequence of sampled images may be obtained based on the obtained action recognition feature.

In an exemplary embodiment of the disclosure, when performing action completeness degree recognition on the feature of the current sequence of sampled images, perform 3D linear gating processing may first be performed on the feature of the current sequence of sampled images to obtain an action completeness recognition feature, and then the completeness of the action contained in the current sequence of sampled images may be obtained based on the obtained action completeness recognition feature.

In an exemplary embodiment of the disclosure, when performing 3D linear gating processing on the feature of the current sequence of sampled images, temporal attention weights may first be generated in the temporal dimension for the feature of the current sequence of sampled images, spatial convolution may be performed on the feature of the current sequence of sampled images in the spatial dimension, and then the temporal attention weights may be dot-multiplied with the spatially convolved feature to obtain 3D linearly gated feature.

In operation S203, the sampling window is adjusted according to the action parameters corresponding to the current sequence of sampled images.

In an exemplary embodiment of the disclosure, when adjusting the sampling window, a change value in size of the sampling window and/or a shifted position of the sampling window may first be calculated based on the action parameters in the current sequence of sampled images, and then the sampling window may be adjusted based on the change value in size of the sampling window and/or the shifted position of the sampling window. Herein, the change value in size of the sampling window may refer to a change value of a size of the next sampling window with respect to a size of the current sampling window. In an exemplary embodiment of the disclosure, the position of the sampling window may be the shifted position of a starting point of the sampling window.

In an exemplary embodiment of the disclosure, when calculating the change value in size of the sampling window and/or the shifted position of the sampling window, when it is determined that the action contained in the current sequence of sampled images is not finished according to the action parameters, an incremental value of the sampling window may first be calculated according to the action parameters, and then the shifted position of the sampling window may be determined according to the incremental value of the sampling window. In an exemplary embodiment of the disclosure, smoothing processing may be performed on the incremental value of the sampling window according to historical adjustment information of the sampling window.

In an exemplary embodiment of the disclosure, when determining the shifted position of the sampling window, a number of frames of sampled increased images in an increased window corresponding to the incremental value of the sampling window may be determined according to the incremental value of the sampling window, and the shifted position of the sampling window may be determined according to the determined number of frames.

In an exemplary embodiment of the disclosure, when calculating the change value in size of the sampling window and/or the shifted position of the sampling window, when it cannot be determined whether the action in the current sequence of sampled images is finished according to the action parameters, a subtraction value of the sampling window may be calculated according to the action parameters, and the shifted position of the sampling window may be determined according to the subtraction value of the sampling window.

In an exemplary embodiment of the disclosure, when determining the shifted position of the sampling window according to the subtraction value of the sampling window, a window of which the length is the subtraction value of the sampling window may first be subtracted from two ends of the sampling window to obtain a first sampling window and a second sampling window, one of the first sampling window and the second sampling window may be used as an updated sampling window, and the shifted position of the current sampling window may be determined according to the updated sampling window.

In an exemplary embodiment of the disclosure, when using one of the first sampling window and the second sampling window as an updated sampling window, a sequence of a preset number of frames of sampled images may first be sampled from the first sampling window and the second sampling window, respectively, feature extraction may be performed on the sequence of sampled images sampled from the first sampling window and the sequence of sampled images sampled from the second sampling window, respectively, and feature recognition may be performed, and then one of the first sampling window and the second sampling window may be selected as the updated sampling window according to the recognition result. In operation S204, the video is sampled based on the adjusted sampling window.

In an exemplary embodiment of the disclosure, when sampling the video based on the adjusted sampling window, the video in the increased window may first be sampled according to the determined number of frames to obtain a sequence of increased images, a sequence of sampled images corresponding to the adjusted sampling window may be acquired in the current sequence of sampled images, and then the sequence of sampled images and the sequence of increased images corresponding to the adjusted sampling window may be used as the sequence of sampled images obtained based on the adjusted sampling window.

In an exemplary embodiment of the disclosure, a preset number of frames of images are obtained by sampling the video based on the sampling window, and the preset number of frames of images may also be obtained by sampling the video based on the adjusted sampling window.

Figure 3:
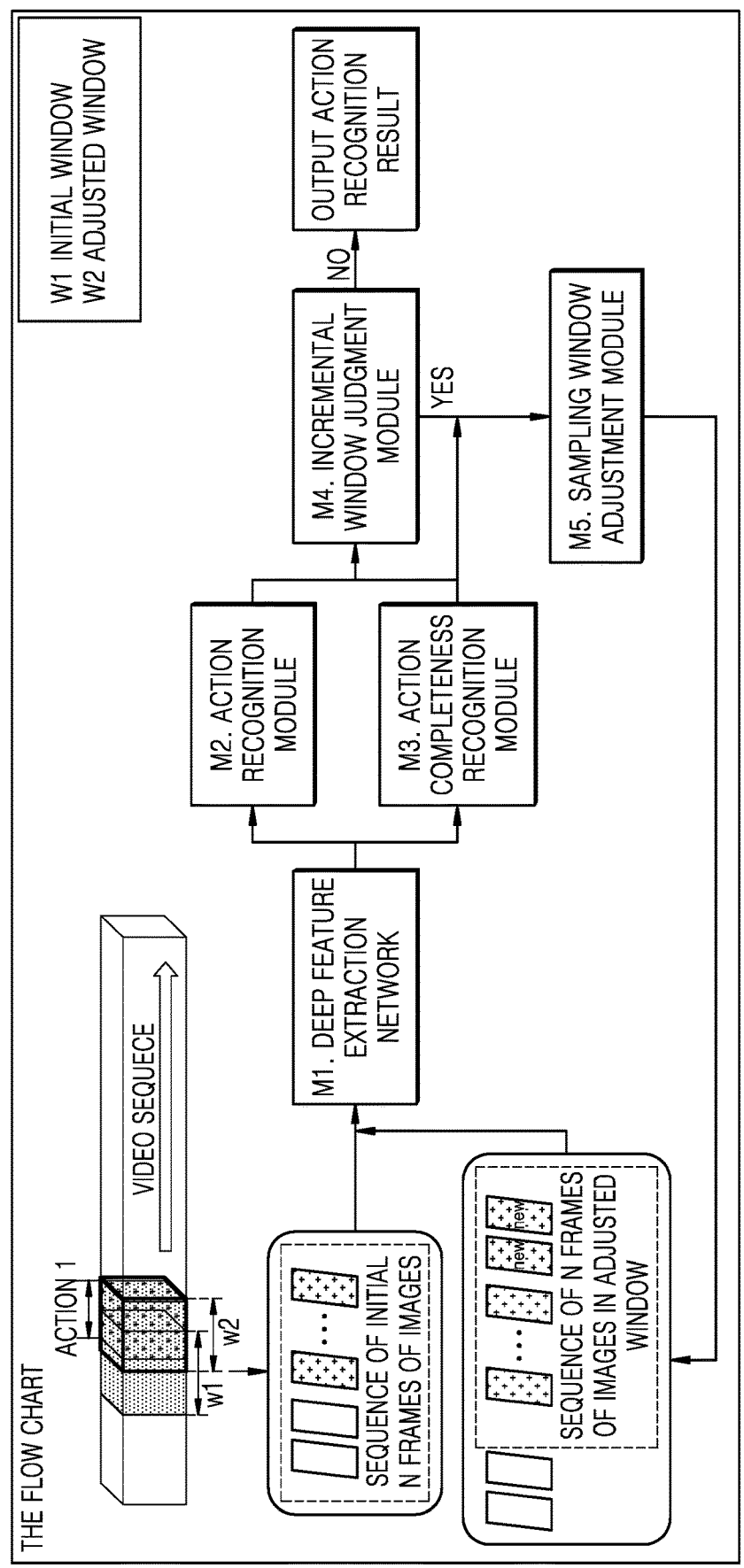
FIG. 3 shows a schematic diagram of a process of video sampling according to an embodiment.

FIG. 3 shows a schematic diagram of a process of video sampling according to an exemplary embodiment of the disclosure.

Referring to FIG. 3, an example of a process of video sampling may be:

1) an initial sampling is performed with a window of a size W, N frames of images are uniformly sampled in an initial window, and then sent to a deep learning feature extraction network M1 to obtain a feature representing information in the current window.

2) The feature is sent to action recognition module M2 for action recognition to obtain classes of various actions contained in the feature and the probabilities of the actions, and sent to action completeness recognition module M3 at the same time for recognition of action completeness to obtain the completeness of the current action, for example, the completeness degree of a specific action may be represented by a percentage.

3) According to a result of action recognition and the completeness of the current action, incremental window judgment module M4 may calculate the window size that needs to be added for the next sampling, and if the current action has been completed or the current window does not contain an action of interest, the result of the current action recognition is directly output without adding the current window, and step 1) is restarted. If the action in the current window is not completed, the size of the window to be added is calculated.

4) In order to ensure robustness and stability, in the disclosure, an estimated increased window value is further smoothed and adjusted in sampling window adjustment module M5 to ensure a stable growth of the window size. According to the size of the adjusted increased window, the shifted position of the window starting point is calculated.

5) According to the starting point of the adjusted window, uniform sampling is performed in the new window, step 1) is performed, and the action recognition and the action completeness estimation are further iteratively performed.

In an exemplary embodiment of the disclosure, feature extraction network M1, action recognition module M2, action completeness recognition module M3, incremental window judgment module M4 and sampling window adjustment module M5 may be units or modules implemented by any combination of software and/or hardware.

Feature extraction network M1 is a feature extraction network, and the input of feature extraction network M1 is multiple frames of images, and the output of feature extraction network M1 is a feature indicating the input information. The feature extraction network may be implemented by a deep neural network.

Action recognition module M2 is used for behavior & action recognition, and the input of action recognition module M2 is a feature, and the output of action recognition module M2 are probabilities of various actions contained in the window.

Action completeness recognition module M3 is used for action completeness recognition, and the input of action completeness recognition module M3 is a feature, and the output of action completeness recognition module M3 is a progress of an action in the window.

Incremental window judgment module M4 is used for incremental window judgment, and the input of incremental window judgment module M4 is the action recognition result and the action completeness recognition result, and the outputs of incremental window judgment module M4 are whether to directly output the results, and whether to increase the length of the window in a next step when the current action is not completed.

Sampling window adjustment module M5 is used for sampling window adjustment, and the input of sampling window adjustment module M5 is the length of the increased window judged by incremental window judgment module M4, and the output is a sequence of input images of a next round sampled in a further adjusted window.

Figure 4:
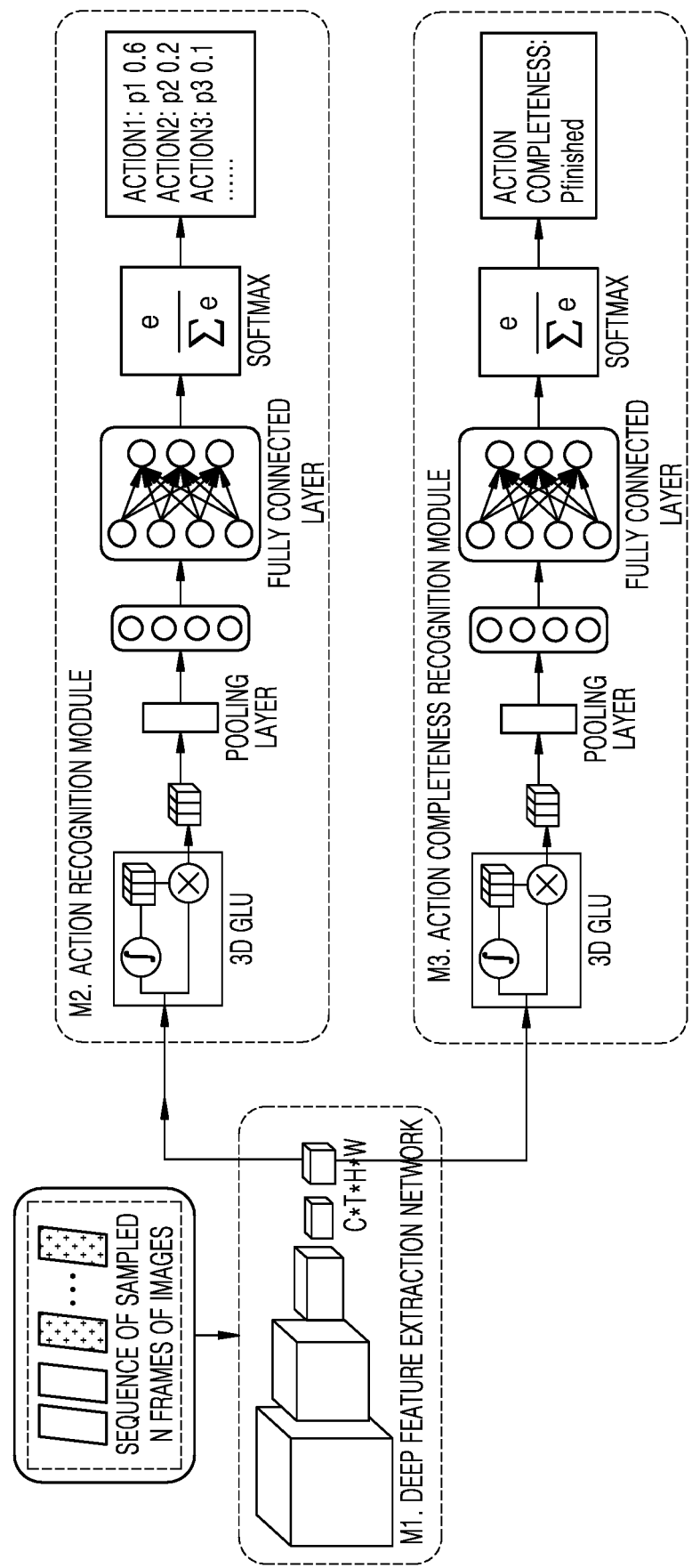
FIG. 4 shows a schematic diagram of internal structures of action recognition module M2 and action completeness recognition module M3 according to an exemplary.

FIG. 4 shows a schematic diagram of internal structures of action recognition module M2 and action completeness recognition module M3 according to an exemplary embodiment of the disclosure.

In an exemplary embodiment of the disclosure, the action recognition and the action completeness recognition may be completed by different independent algorithm networks, respectively, and may also be designed by using a multi-task network structure. If the multi-task structure network structure is used, referring to FIG. 4, action recognition module M2 and action completeness recognition module M3 may use a public basic feature extraction network M1 to extract the feature, and an advantage of this design is that it may greatly reduce the amount of computation in the network. Moreover, since development processes of the same kind of actions are often similar, consistent features extracted by a lower feature extraction network shared by two branches may represent both their classes and the completeness degree of the current action, and the lower network structure and the parameter shared by the two branches have actual practical significance.

Specifically, the size of the input feature may be CxTxHxW. Herein, C is the number of feature channels, T is the length of a feature timeline, H is a height in the feature space, and W is a width in the feature space.

In an exemplary embodiment of the disclosure, in action recognition module M2, the input feature firstly passes through a 3D gated linear unit (3D GLU) to discriminate features for the behavior recognition, and then passes through a pooling layer, a full connection layer, and a softmax layer to output its probabilities in all action classes. In action completeness recognition module M3, the input feature passes through the 3D GLU to be the discriminative features for the action completeness recognition, and then passes through the pooling layer, the full connection layer, and the softmax layer to output the completeness value of the action.

In action recognition module M2 and action completeness recognition module M3, the input of the 3D GLU is the same input feature of the low network, and the output is the discriminative features oriented to different tasks. The function implemented by the 3D GLU may be to generate discriminative output features oriented to the task. The discrimination of the features is reflected in the following two aspects:

i. For the action recognition and the action completeness recognition, different temporal attention degrees are provided, so that the output features of the two branches are discriminative. For the action recognition, the recognition results of the same action with different completeness degrees should be the same, and thus, the 3D GLU of the action recognition branch may pay more attention to the starting position of the action. With respect to the action completeness recognition, the results of recognition for the same action with the same starting point and different ending points are different, and the 3D GLU branch may pay more attention to the position where the action ends.

ii. Convolutions are performed using different convolution kernel parameters on the features, thereby increasing task-related parameters and making the features themselves discriminative. In the 3D GLU, the internal convolution kernels thereof in the training process are different due to different tasks, the convolution kernel parameters of the two branches are naturally different, and thus, the output features of the same feature are different after convolution. This is equivalent to that the depth of the network is deepened in each of the two branches, and discriminative expression capabilities are given to the features.

Figure 5:
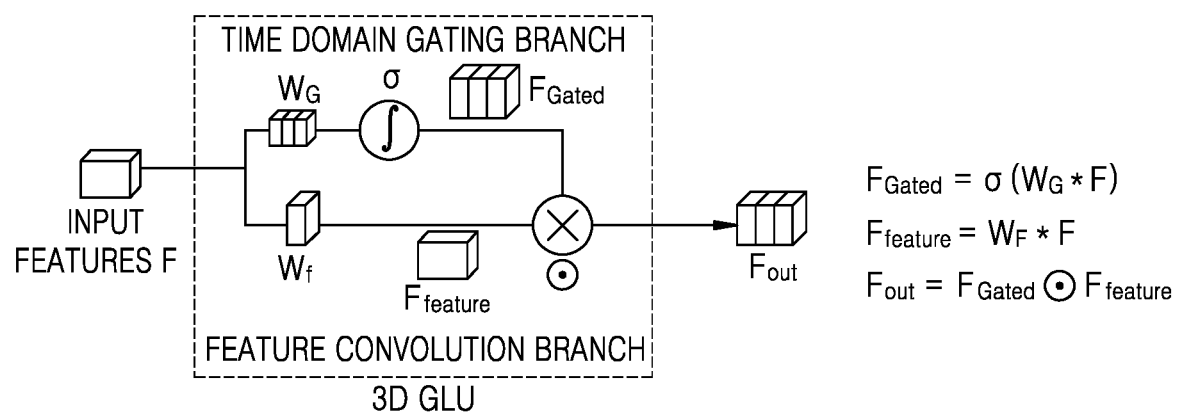
FIG. 5 shows a schematic diagram of an internal structure of a 3D GLU according to an embodiment.

FIG. 5 shows a schematic diagram of an internal structure of a 3D GLU according to an exemplary embodiment of the disclosure.

Referring to FIG. 5, the interior of the 3D GLU is divided into two branches: a time domain gating branch and a feature convolution branch.

i. Time Domain Gating Branch

The time domain gating branch may generate different temporal attention weights in the temporal dimension.

The time domain gating branch may be formed by two layers. One layer is a convolutional layer WG in the temporal dimension, and the shape of the convolution kernel thereof is $[K_t, 1, 1]$, and herein, $K_t$ is a size parameter of the convolution kernel on the timeline. The convolution kernel in the time dimension performs convolution on the timeline T.

The later layer is a Sigmoid non-linear layer, which generates the attention weights on the timeline through a gating non-linear layer.

ii. Feature Convolution Branch

This branch may directly perform convolution on the input feature in the spatial dimension, the dimension of the convolution kernel is $[1, K_s, K_s]$, and herein, $K_s$ is the size of the convolution kernel in the spatial dimension. Thus the computing depth of the network is increased, and a more abundant expressivity is given to the feature.

The outputs of both of the branches are features of the same dimension, and finally, the outputs of the two branches are combined by using an operation of dot multiplication so as to pay attentions to the features with different weights in the temporal dimension.

Figure 6:
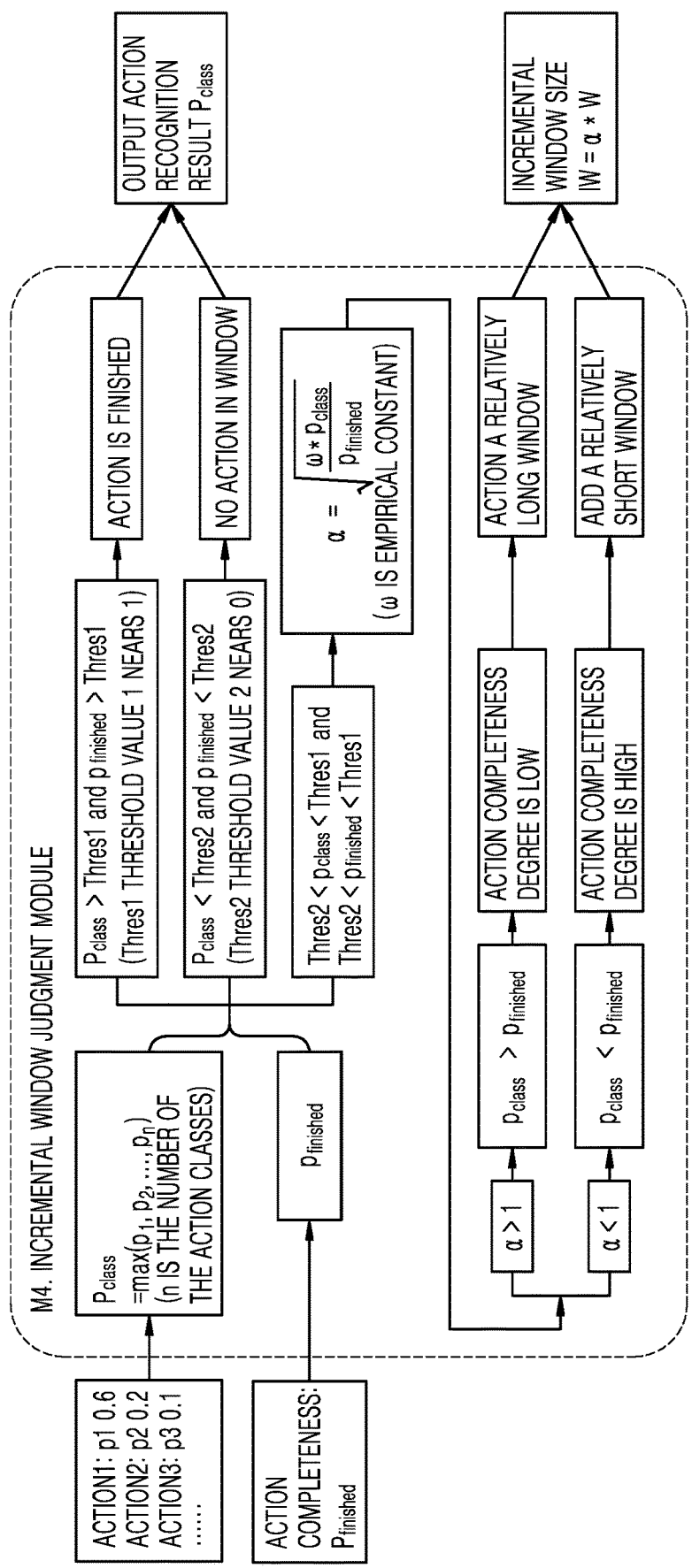
FIG. 6 shows a schematic diagram of an internal structure of a part used for incremental window adjustment of incremental window judgment module M4 according to an embodiment.

FIG. 6 shows a schematic diagram of an internal structure of a part used for incremental window adjustment of incremental window judgment module M4 according to an exemplary embodiment of the disclosure.

In an exemplary embodiment of the disclosure, incremental window judgment module M4 decides a next sampling strategy based on the current behavior & action recognition result and behavior & action completeness result. The outputting of incremental window judgment module M4 may have two manners: if the current window has no action or the action is finished, a new round is started and the sampling is performed with the initial window size; and if the action in the current window is not finished yet, the size of the window to be add is determined based on the current window. When the action completeness is relatively high, a relatively small window is added. When the action completeness is relatively low, a relatively large window is added.

Specifically, referring to FIG. 6, the specific calculation process in incremental window judgment module M4 is as follows:

The maximum value of the results of the action recognition on different action classes is taken to get the predicted behavior & action class and its probability, which is divided into three cases in conjunction with the results of action completeness:

If the behavior & action recognition probability $p_{Class}$ and the action completeness $p_{finished}$ are both larger than a threshold $Thres_1$, it indicates that the action in the current window is well recognized and the action is basically completed, and then a new round of sampling with the initial fixed window size is started.

If the behavior & action recognition probability $p_{class}$ and the action completeness $p_{finished}$ are both smaller than a threshold $Thres_2$, it indicates that the possibilities of all action classes contained in the current window are very low and the action completeness is also relatively low, it indicates that the current window may not contain an action, and then a new round of sampling with the initial fixed window size is started.

If the behavior & action recognition probability $p_{class}$ and the action completeness $p_{finished}$ are between the threshold $Thres_2$ and the $Thres_1$, it is deemed that the current window contains an ongoing action, and a parameter a is calculated through the following Equation 1:

$$\alpha = \sqrt{\frac{\omega * p_{class}}{p_{finished}}} \text{ ($\omega$ is an empirical constant).} \quad \text{(Equation 1)}$$

The size of the incremental window is shown in Equation 2 below:

$$IW=\alpha*W \quad \text{(Equation 2)}$$

Herein, the W is the size of the window corresponding to this sampling.

Figure 7:
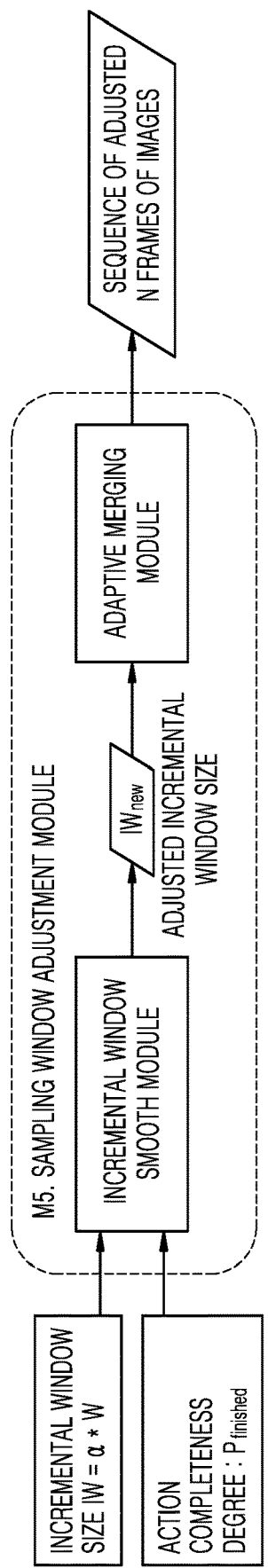
FIG. 7 shows a schematic diagram of an internal structure of sampling window adjustment module M5 according to an embodiment.

FIG. 7 shows a schematic diagram of an internal structure of sampling window adjustment module M5 according to an exemplary embodiment of the disclosure.

In an exemplary embodiment of the disclosure, the function of sampling window adjustment module M5 may relate to further adjusting the size of the incremental window and determining a starting position of a new round sampling window. In FIG. 7, sampling window adjustment module M5 is divided into two sub-portions: an incremental window smooth portion and a window adaptation portion, examples of which will be explained below by referring to FIGS. 8 and 9, respectively.

Figure 8:
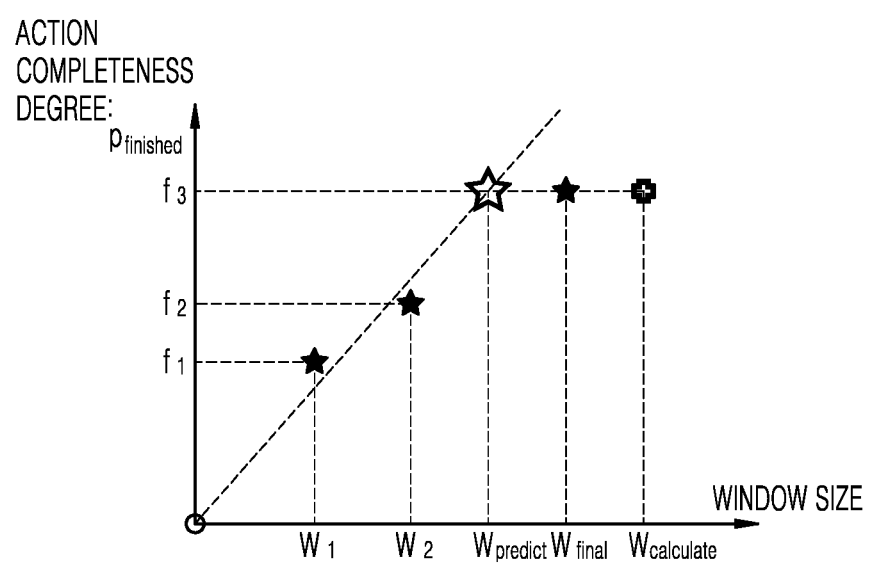
FIG. 8 shows a schematic diagram of incremental window smoothing according to an embodiment.

FIG. 8 shows a schematic diagram of incremental window smoothing according to an exemplary embodiment of the disclosure.

The function of incremental window smoothing is to smooth the size of the current calculated incremental window based on several previous records of adjusting the incremental window to ensure that the growth of the incremental window and the change of the action completeness are robust and stable. The inputs of the incremental window smoothing are the incremental window size IW obtained by incremental window judgment module M4 and the action completeness degree $p_{finished}$ in the current window, and the output is a smoothed final incremental window size $IW_{new}$.

An example of specific calculation process of the incremental window smoothing is as follows:

i. storing the former two sampling window sizes $(w_1, w_2)$ and the corresponding completeness $(f_1, f_2)$ in the system;

ii. linearly fitting the relationship between the window size and the completeness, and based on the action completeness $p_{finished}$ in the current window, deriving a size $w_{predict}$ of the window corresponding to the current action completeness; and iii. the window size obtained by incremental window judgment module M4 is $w_{calculate}=w_2+IW$, the finally adjusted window size is $w_{final}=0.5*(w_{predict}+w_{calculate})$, and the corresponding incremental window size is $IW_{new}=w_{final}-w_2$.

Figure 9:
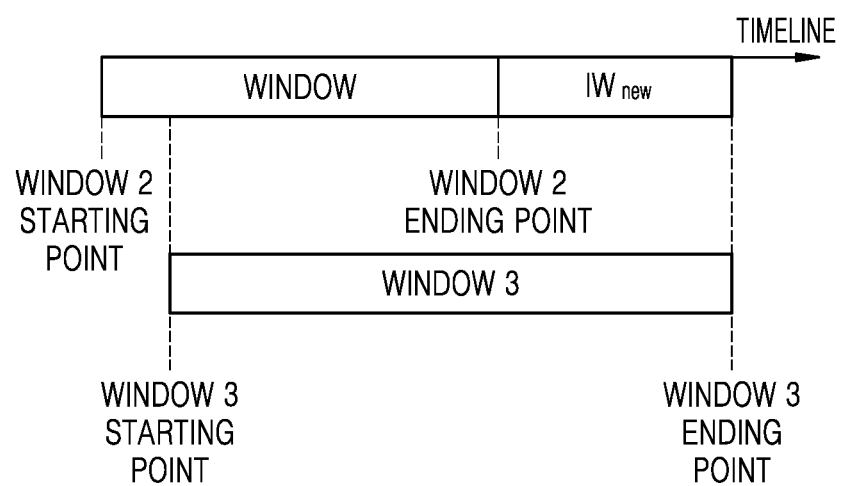
FIG. 9 shows a schematic diagram of window adaptation according to an embodiment.

FIG. 9 shows a schematic diagram of window adaptation according to an exemplary embodiment of the disclosure.

As for the network of the behavior & action recognition, the input data size thereof may be fixed, thus, with respect to the windows with different sizes, the number of frames of the sampled images thereof may be a fixed number N, and the number may be adjusted according to different systems and different target actions.

The function of window adaptation is to sample Now frames of new images from the newly added window according to the size of the incremental window, and delete $N_{add}$ frames of images from a head portion in the former sampled N frames of images, and thus merge the $N_{add}$ frames of new images and the remain $N-N_{add}$ frames of images to be a sequence of a new round of N frames of sampled images. The calculation formula of $N_{add}$ is shown in Equation 3 below:

$$N_{add}=P*IW/((w_2+IW)/N). \quad \text{(Equation 3)}$$

Herein, P is an empirical coefficient, and P>1, thereby ensuring that relatively more information is added in the newly added window. IW is the size of the incremental window, $w_2$ is the size of the former sampling window, and N is the number of the sampled frames. These frames of images are added, and these frames of images are deleted in the former sampling at the same time to ensure that the input data of the final new round is also N frames.

The solution corresponding to the incremental window may relate to the case where a long action is cut off. Because in actual applications, the size of the initial window is often relatively small, the case where the long action is cut off causing the recognition precision to be not high is improved by increasing the length of the window. For a particularly short action, the length thereof may be shorter than the initial window length. The disclosure relates to a subtraction window adjustment solution to deal with the problem of short action recognition, thereby avoiding blindly reducing the size of the initial window to deal with the short action. Such a design may be more efficient.

Figure 10:
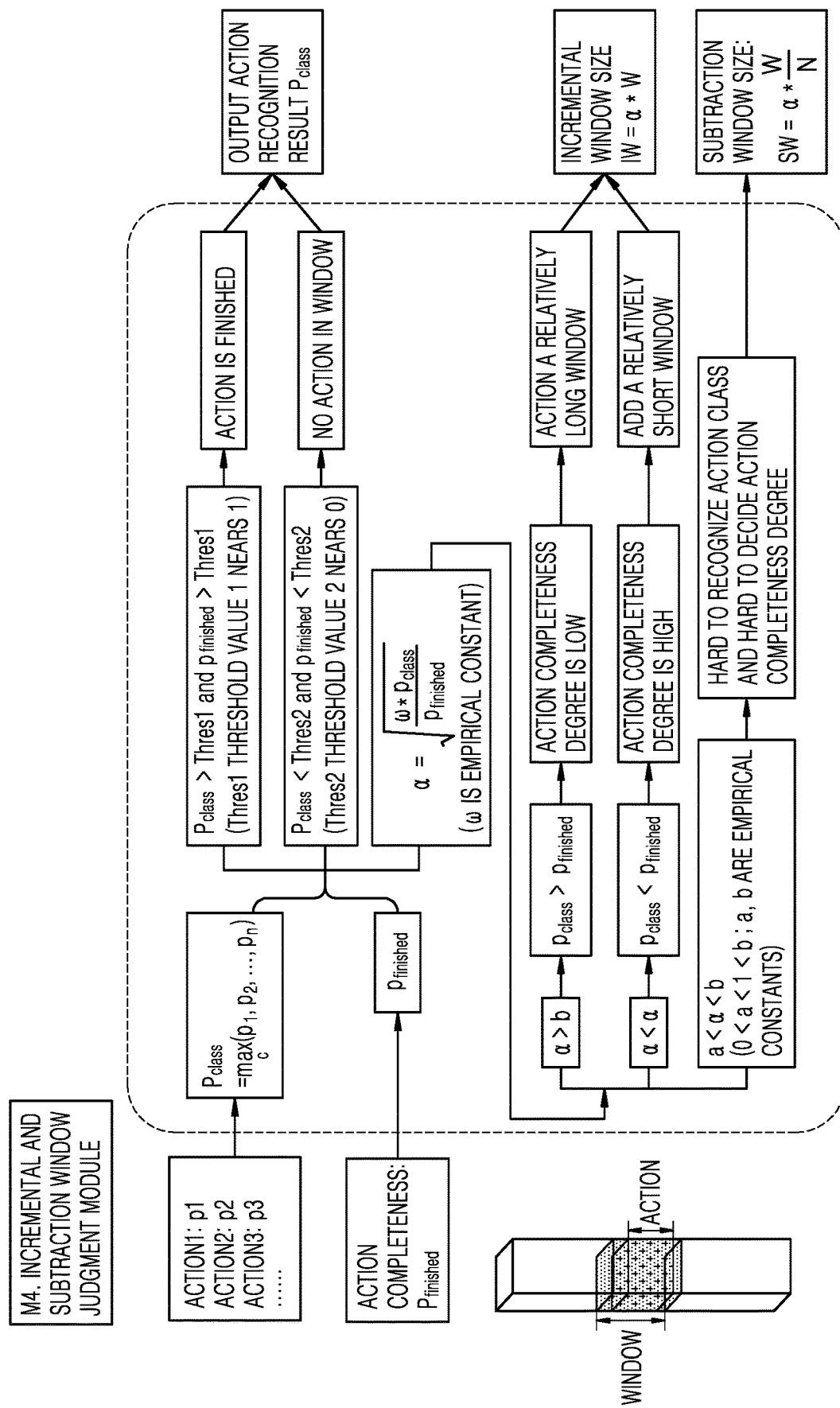
FIG. 10 shows a schematic diagram of an internal structure of a part used for subtraction window adjustment of incremental window judgment module M4 according to an embodiment.

FIG. 10 shows a schematic diagram of an internal structure of a part used for subtraction window adjustment of incremental window judgment module M4 according to an exemplary embodiment of the disclosure.

A discriminative branch is added based on the incremental window adjustment. When the parameter a is between (a, b), it indicates that it is hard for the algorithm to recognize the action class within the window and whether the action within the window is completed. This case is always caused by background noise mixed in the window, and thus, in this case, the window size SW to be subtracted is calculated. The calculation formula of SW is shown as Equation 4 below:

$$SW=\alpha*W/N. \quad \text{(Equation 4)}$$

Herein, W is a length of the current sampling window, and N is the number of frames the images sampled in the current window.

Figure 11:
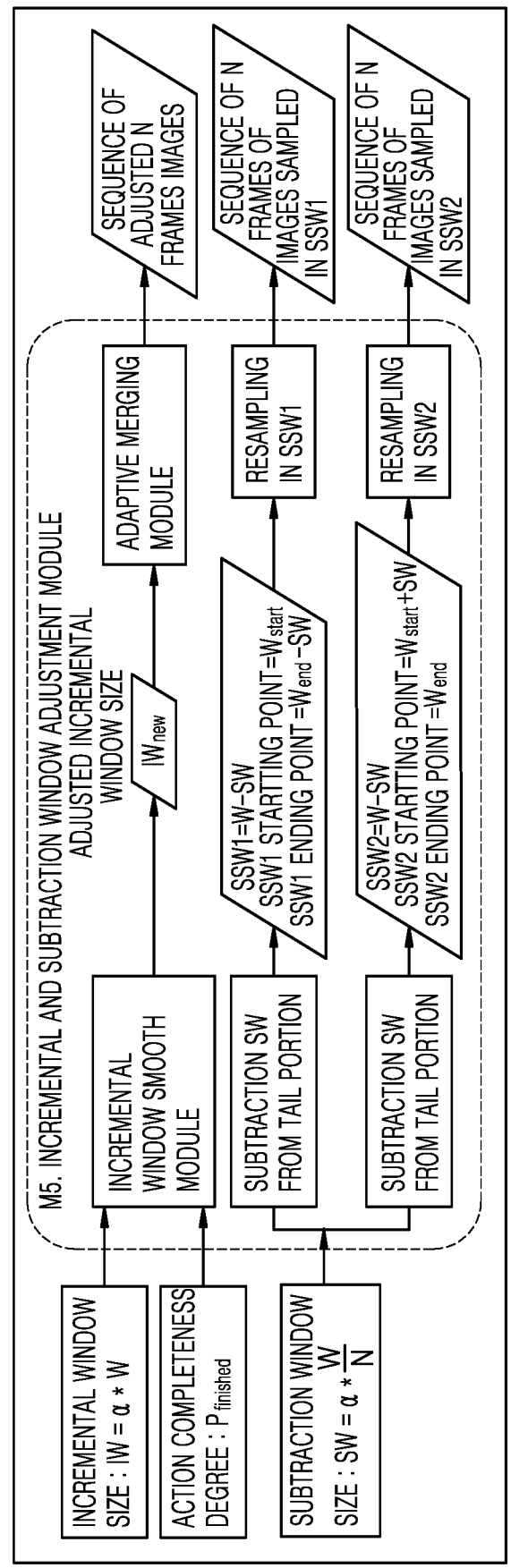
FIG. 11 shows a schematic diagram of an internal structure of incremental window judgment module M4 according to an embodiment.
Figure 12:
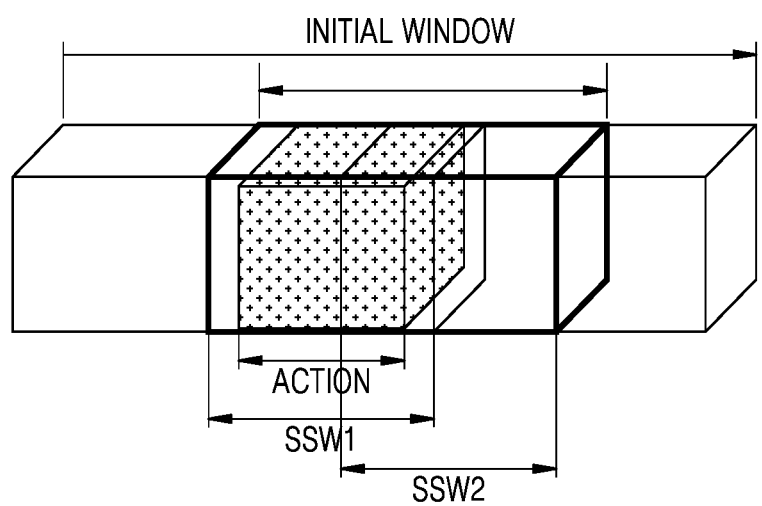
FIG. 12 shows a schematic diagram of a process of calculating subtraction window according to an embodiment.

FIG. 11 shows a schematic diagram of an internal structure of incremental window judgment module M4 used for incremental window adjustment and subtraction window adjustment according to an exemplary embodiment of the disclosure. FIG. 12 shows a schematic diagram of a process of calculating subtraction window according to an exemplary embodiment of the disclosure.

Referring to FIGS. 11 and 12, according to the size of the subtraction window calculated by incremental window judgment module M4, a window with a length of SW is deleted in head and tail directions at the initial sampling window, respectively, to obtain SSW1 and SSW2, moreover, N frames of images are sampled in newly obtained windows, respectively, for behavior & action recognition and behavior & action completeness recognition, and finally, the window having a relatively high action recognition probability between the SSW1 and the SSW2 is taken. This design may deal with the case where the short action is located anywhere in the window, and if the action is closer to the starting point of the window, the SSW1 contains more action information and its recognition result is more accurate; and if the action is closer to the ending point of the initial window, the SSW2 will contain more action information, and its recognition result will be more accurate. It can be seen that for the short action, there is no need to specifically reduce the size of the initial window, and the noise in the window may be effectively subtracted, and it may locate the short action at any position in the window to implement high-precision recognition and positioning of the short action. In FIG. 12, the action is a short action with respect to the window size, thus, a noise portion in the window is subtracted, so that the adjusted window contains the whole action and the contained noise is as less as possible.

Figure 13:
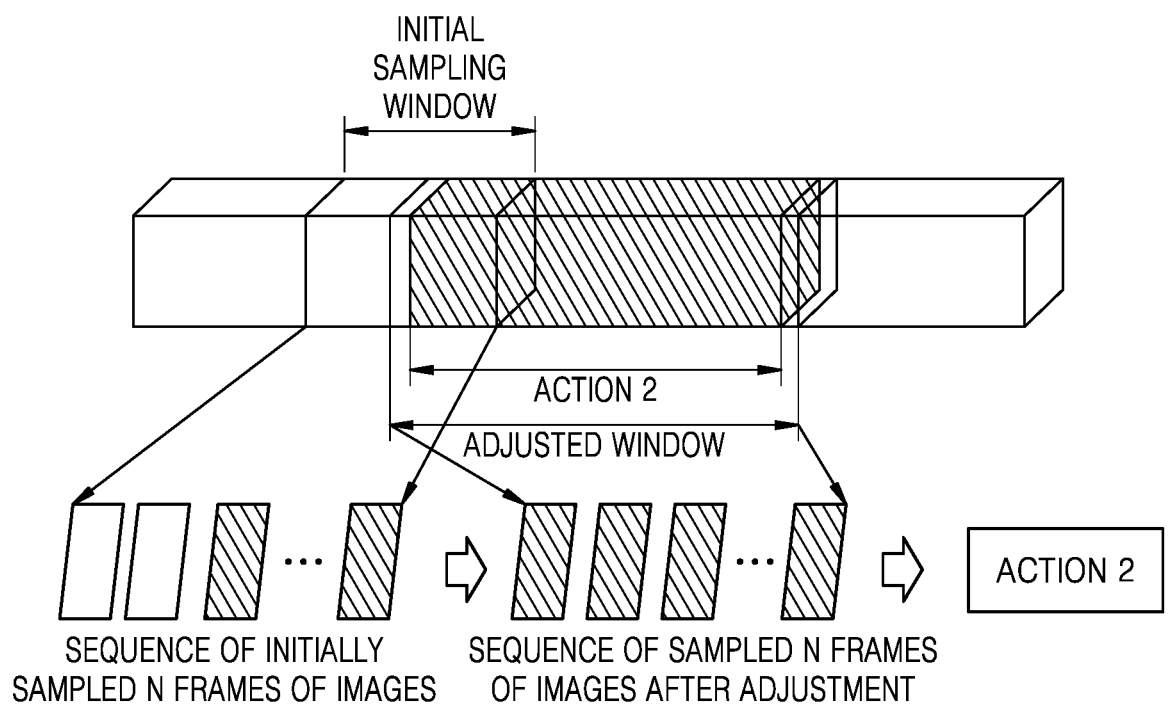
FIG. 13 shows a schematic diagram of adjusting a window for a long action that is cut off according to an embodiment.

FIG. 13 shows a schematic diagram of adjusting a window for a long action that is cut off according to an exemplary embodiment of the disclosure.

Referring to FIG. 13, for the long action that is cut off, the initial position of the window may be iteratively adjusted through the above method of increasing the window, such that the final window contains a complete action process, and high-precision behavior & action recognition and positioning is achieved. In FIG. 13, Action 2 is a long action with respect to the window size, and thus, the sampling window is increased, so that the increased sampling window contains the whole Action 2.

Figure 14:
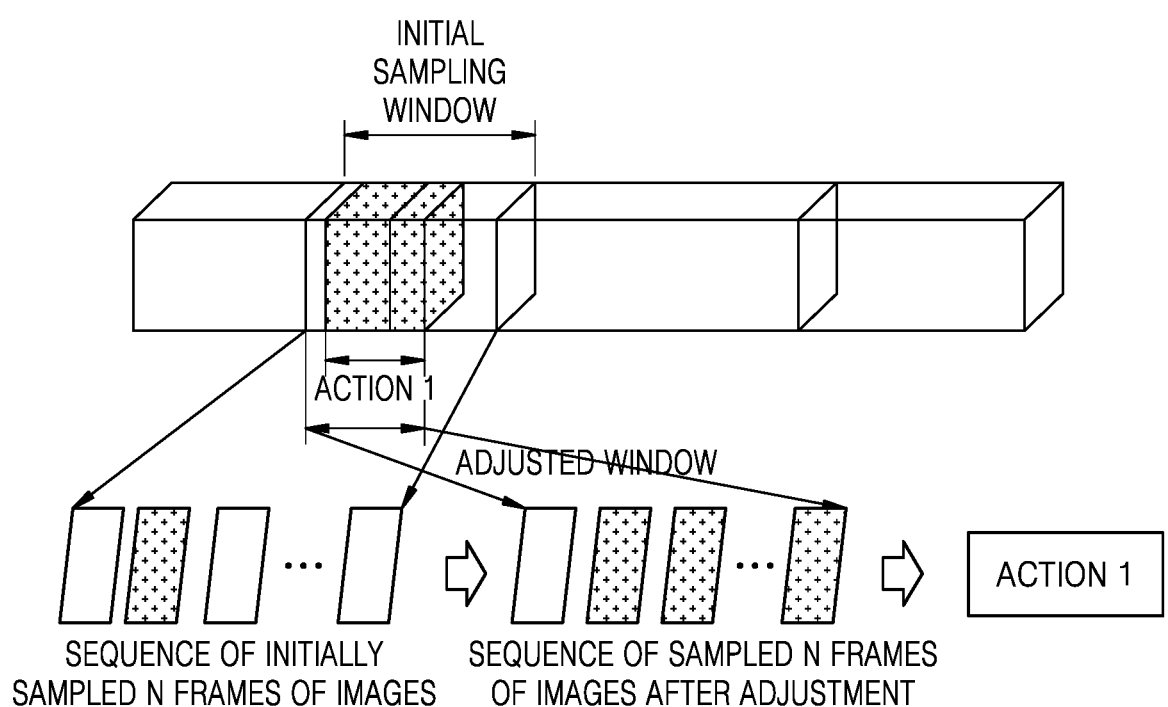
FIG. 14 shows a schematic diagram of adjusting a window for a short action according to an exemplary.

FIG. 14 shows a schematic diagram of adjusting a window for a short action according to an exemplary embodiment of the disclosure.

Referring to FIG. 14, for a short action shorter than the initial window, there is no need to specifically reduce the size of the initial window, and the noise in the window may be effectively subtracted, and it may be located to the short action located at any position in the window, so that the adjusted window contains the whole process that the action occurs, to implement high-precision recognition and positioning of the short action. In FIG. 14, Action 1 is a short action with respect to the window size, thus, a noise portion in the window is subtracted, so that the adjusted window contains the whole Action 1 and the contained noise is as less as possible.

The video sampling method according to exemplary embodiments of the disclosure has been described in conjunction with FIGS. 1-14. Hereinafter, a video sampling apparatus and units thereof according to an exemplary embodiment of the disclosure will be described with reference to FIG. 15.

Figure 15:
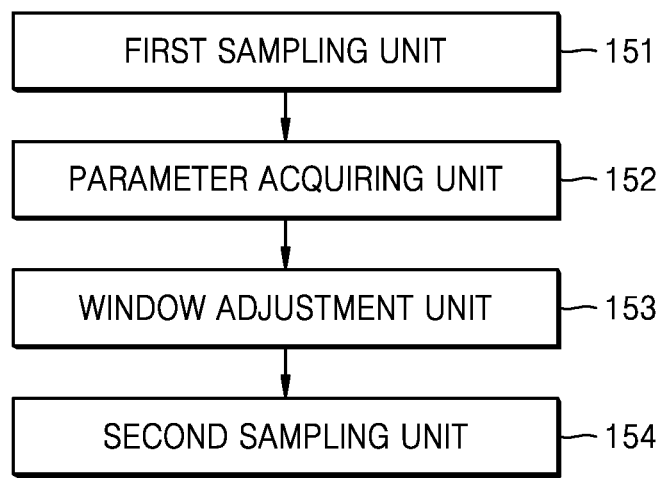
FIG. 15 shows a block diagram of a video sampling apparatus according to an embodiment.

FIG. 15 shows a block diagram of a video sampling apparatus according to an exemplary embodiment of the disclosure.

Referring to FIG. 15, the video sampling apparatus includes a first sampling unit 151, a parameter acquiring unit 152, a window adjustment unit 153 and a second sampling unit 154.

The first sampling unit 151 is configured to sample a video based on a sampling window to obtain a current sequence of sampled images.

The parameter acquiring unit 152 is configured to acquire action parameters corresponding to the current sequence of sampled images.

In an exemplary embodiment of the disclosure, the action parameters may include a probability of containing an action in the current sequence of sampled images and/or completeness of the contained action.

In an exemplary embodiment of the disclosure, the parameter acquiring unit 152 may include a feature extraction unit configured to perform feature extraction on the current sequence of sampled images to obtain the feature of the current sequence of sampled images, and a feature recognition unit configured to perform feature recognition on the feature of the current sequence of sampled images to obtain the action parameters in the current sequence of sampled images.

In an exemplary embodiment of the disclosure, the action parameters may include a probability of containing an action in the current sequence of sampled images and the completeness of the contained action. The feature recognition unit may be configured to perform action recognition on the feature of the current sequence of sampled images to obtain the probability of containing an action in the current sequence of sampled images, and to perform recognition of an action completeness degree on the feature of the current sequence of sampled images to obtain the completeness of the action contained in the current sequence of sampled images.

In an exemplary embodiment of the disclosure, the video sampling apparatus may further include a determination unit configured to select an action with the highest probability contained in the current sampled image sequence from various actions as the action contained in the current sampled image sequence, to determine that the action contained in the current sequence of sampled images is finished, when the probability of containing the action in the current sequence of sampled images is greater than a first threshold, and the completeness of the action contained in the current sequence of sampled images is greater than a second threshold, and/or, to determine that the current sequence of sampled images does not contain an action, when the probability of containing the action in the current sequence of sampled images is less than a third threshold, and the completeness of the action contained in the current sequence of sampled images is less than a fourth threshold, and/or, to determine that the action contained in the current sequence of sampled images is not finished, when the probability of containing the action in the current sequence of sampled images is between the first threshold and the third threshold, and the completeness of the action contained in the current sequence of sampled images is between the second threshold and the fourth threshold.

The window adjustment unit 153 is configured to adjust the sampling window according to the action parameters corresponding to the current sequence of sampled images, so as to sample the video based on the adjusted sampling window.

In an exemplary embodiment of the disclosure, the window adjustment unit 153 may be configured to calculate a change value in size of the sampling window and/or a shifted position of the sampling window according to the action parameters in the current sequence of sampled images, and to adjust the sampling window based on the change value in size of the sampling window and/or the shifted position of the sampling window.

In an exemplary embodiment of the disclosure, the window adjustment unit 153 may further be configured to calculate an incremental value of the sampling window according to the action parameters, when it is determined that the action contained in the current sequence of sampled images is not finished according to the action parameters, and to determine the shifted position of the sampling window according to the incremental value of the sampling window.

In an exemplary embodiment of the disclosure, the video sampling apparatus may further include a smooth and adjustment unit configured to perform smoothing processing on the incremental value of the sampling window according to historical adjustment information of the sampling window.

In an exemplary embodiment of the disclosure, the window adjustment unit 153 may further be configured to determine a number of frames of sampled increased images in an increased window corresponding to the incremental value of the sampling window according to the incremental value of the sampling window, and to determine the shifted position of the sampling window according to the determined number of frames.

In an exemplary embodiment of the disclosure, the window adjustment unit 153 may further be configured to calculate an subtraction value of the sampling window according to the action parameters when it cannot be determined whether the action in the current sequence of sampled images is finished according to the action parameters, and to determine the shifted position of the sampling window according to the subtraction value of the sampling window.

In an exemplary embodiment of the disclosure, the window adjustment unit 153 may further be configured to subtract a window of which the length is the subtraction value of the sampling window from two ends of the sampling window to obtain a first sampling window and a second sampling window, to use one of the first sampling window and the second sampling window as an updated sampling window, and to determine the shifted position of the current sampling window according to the updated sampling window.

In an exemplary embodiment of the disclosure, the window adjustment unit 153 may further be configured to sample a sequence of a preset number of frames of sampled images from the first sampling window and the second sampling window, respectively, to perform feature extraction on the sequence of sampled images sampled from the first sampling window and the sequence of sampled images sampled from the second sampling window and perform feature recognition, and to select one of the first sampling window and the second sampling window as the updated sampling window according to the recognition result.

In an exemplary embodiment of the disclosure, the position of the sampling window is the shifted position of a starting point of the sampling window.

In an exemplary embodiment of the disclosure, the feature recognition unit may further be configured to perform 3D linear gating processing on the feature of the current sequence of sampled images to obtain an action recognition feature, and to acquire a probability of containing an action in the current sequence of sampled images based on the obtained action recognition feature.

In an exemplary embodiment of the disclosure, the feature recognition unit may further be configured to perform 3D linear gating processing on the feature of the current sequence of sampled images to obtain an action completeness recognition feature, and to acquire completeness of the action contained in the current sequence of sampled images based on the obtained action completeness recognition feature.

In an exemplary embodiment of the disclosure, the feature recognition unit may further be configured to generate temporal attention weights in the temporal dimension for the feature of the current sequence of sampled images, to perform spatial convolution on the feature of the current sequence of sampled images in the spatial dimension, and to dot-multiply the temporal attention weights with the spatially convolved feature to obtain a 3D linearly gated feature.

The second sampling unit 154 is configured to sample the video based on the adjusted sampling window.

In an exemplary embodiment of the disclosure, the second sampling unit 154 may be configured to sample a video in the increased window according to the determined number of frames to obtain a sequence of additional images, to acquire a sequence of sampled images corresponding to the adjusted sampling window in the current sequence of sampled images, and to use the sequence of sampled images and the sequence of additional images corresponding to the adjusted sampling window as the sequence of sampled images obtained based on the adjusted sampling window.

In an exemplary embodiment of the disclosure, the first sampling unit and the second sampling unit respectively perform sampling to obtain a preset number of frames of images.

In addition, according to an exemplary embodiment of the disclosure, there is further provided a computer-readable storage medium storing a computer program thereon, when the computer program is executed, the video sampling method according to the exemplary embodiment of the disclosure is implemented.

In an exemplary embodiment of the disclosure, the computer-readable storage medium may carry one or more programs, and when the computer program is executed, the following steps may be implemented: sampling a video with a current sampling window to obtain a current sequence of a preset number of frames of sampled images, performing feature extraction on the current sequence of sampled images to obtain a feature of the current sequence of sampled images, performing feature recognition on the feature of the current sequence of sampled images to obtain the action parameters in the current sequence of sampled images, calculating a change value in size of a window used for a next sampling and a shifted position of a starting point of the window based on the action parameters in the current sequence of sampled images, and performing next sampling of the video with the obtained next sampling window based on the change value in size of the window and the adjustment of the shifted position of the window starting point.

At least one of the components, elements, modules or units (collectively "components" in this paragraph) represented by a block in FIG. 15 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The computer-readable storage medium may be, for example, but is not limited to, an electronic, magnetic, optical, electromagnetic, infrared, or semiconductor system, apparatus, or device, or any combination of the above-mentioned. More specific examples of the computer-readable storage medium may include, for example, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above-mentioned. In an embodiment of the disclosure, the computer-readable storage medium may be any tangible medium containing or storing a computer program, and the computer program may be used by an instruction execution system, an apparatus or a device or a combination thereof. Computer programs contained in the computer-readable storage medium may be transmitted by any appropriate medium, including but not limited to: electrical wires, fiber optic cables, RF (radio frequency), etc., or any suitable combination of the above-mentioned. The computer-readable storage medium may be contained in any device; and may also exist alone without being assembled in the device.

The video sampling apparatus according to exemplary embodiments of the disclosure has been described in conjunction with FIG. 15. In the next, an electronic apparatus according to an exemplary embodiment of the disclosure may be described in conjunction with FIG. 16.

Figure 16:
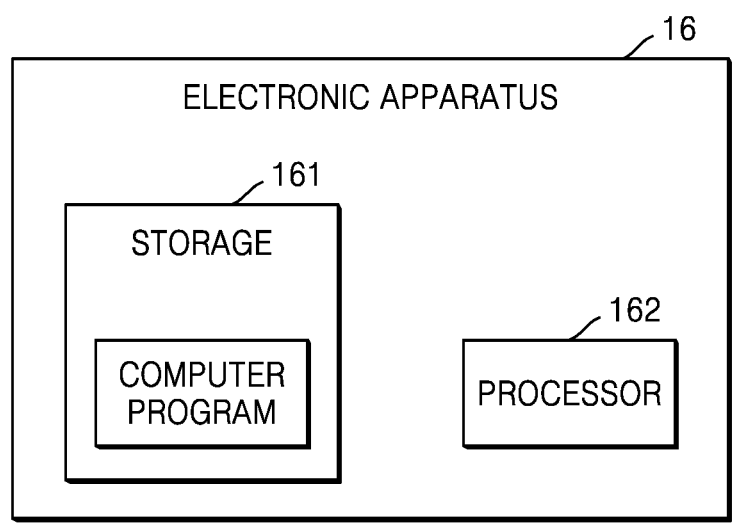
FIG. 16 shows a schematic diagram of an electronic apparatus according to an embodiment.

FIG. 16 shows a schematic diagram of an electronic apparatus according to an exemplary embodiment of the disclosure.

Referring to FIG. 16, an electronic apparatus 16 according to an exemplary embodiment of the disclosure includes a storage 161 and a processor 162 The storage 161 stores a computer program, and when the computer program is executed by the processor 162, the video sampling method according to exemplary embodiments of the disclosure is implemented.

In an exemplary embodiment of the disclosure, when the computer program is executed by the processor 162, the following steps may be implemented: a video with may be sampled with a current sampling window to obtain a current sequence of a preset number of frames of sampled images, a feature extraction may be performed on the current sequence of sampled images to obtain a feature of the current sequence of sampled images, feature recognition may be performed on the feature of the current sequence of sampled images to obtain the action parameters in the current sequence of sampled images, a change value in a size of a window used for a next sampling and a shifted position of a starting point of the window may be calculated based on the action parameters in the current sequence of sampled images, and next sampling may be performed with the obtained next sampling window based on the change value in the size of the window and the adjustment of the shifted position of the window starting point.

The electronic apparatus in the embodiment of the disclosure may include, but is not limited to, devices such as a mobile phone, a notebook computer, a PDA (personal digital assistant), a tablet computer, a desktop computer, and the like. The electronic apparatus shown in FIG. 16 is only an example, which should not bring any limitation to the function and the range of application of the embodiments of the disclosure.

The video sampling method and the apparatus according to the exemplary embodiments of the disclosure have been described by referring to FIGS. 1-16. However, it should be understood that the video sampling apparatus and units thereof shown in FIGS. 1-16 may be respectively configured as software, hardware, firmware, or any combination of the above mentioned items performing specific functions, and the electronic apparatus shown in FIG. 1-16 are not limited to including the components shown above, but some components that may be added or deleted as needed, and the above components may also be combined.

The video sampling method and the apparatus according to the exemplary embodiment of the disclosure may obtain a current sequence of sampled images by sampling a video based on a sampling window, acquire action parameters corresponding to the current sequence of sampled images, adjust the sampling window according to the action parameters corresponding to the current sequence of sampled images and sample the video based on the adjusted sampling window, thereby implementing high-precision recognition and positioning of an action, and further improving the accuracy of video sampling.

While the disclosure has been particularly shown and described with reference to the exemplary embodiments thereof, it will be understood by those skilled in the art that various changes in form and details may be made therein without departing from the spirit and scope of the disclosure as defined by the claims.

What is claimed is:

1. A video sampling method, comprising:
   sampling a video based on a sampling window to obtain a current sequence of sampled images;
   acquiring action parameters corresponding to the current sequence of sampled images, wherein the action parameters comprise a probability that an action is contained in the current sequence of sampled images, and a completeness degree which indicates a completeness of the action contained in the current sequence of sampled images;
   selecting a candidate action having a highest probability from among candidate actions included in the current sequence of sampled images sequence as the action;
   determining whether the action is finished and whether the current sequence of sampled images contains the action based on a comparison between the probability and at least one first threshold, and a comparison between the completeness degree and at least one second threshold;
   based on determining that the action contained in the current sequence of sampled images is not finished, calculating an incremental size of the sampling window according to the action parameters;
   performing smoothing processing on the incremental size according to historical adjustment information of the sampling window;
   determining a shifted position of the sampling window according to the incremental size;
   adjusting the sampling window based on the shifted position; and
   sampling the video based on the adjusted sampling window.

2. The video sampling method of claim 1, wherein the acquiring of the action parameters comprises:
   performing feature extraction on the current sequence of sampled images to obtain a feature of the current sequence of sampled images; and
   performing feature recognition on the feature to obtain the action parameters.

3. The video sampling method of claim 2,
   wherein the performing of the feature recognition comprises:
   performing action recognition on the feature to obtain the probability; and
   performing action completeness degree recognition on the feature to obtain the completeness degree.

4. The video sampling method of claim 3, further comprising:
- based on the probability being greater than a first threshold, and the completeness degree being greater than a second threshold, determining that the action is finished;
- based on the probability being than a third threshold, and the completeness degree being less than a fourth threshold, determining that the current sequence of sampled images does not contain the action; and
- based on the probability being between the first threshold and the third threshold, and the completeness degree being between the second threshold and the fourth threshold, determining that the action is not finished.

5. The video sampling method of claim 1, wherein the determining the shifted position comprises:
- determining a number of frames of sampled increased images in an increased window corresponding to the incremental size according to the incremental size; and
- determining the shifted position according to the determined number of frames.

6. The video sampling method of claim 5, wherein the sampling of the video based on the adjusted sampling window comprises:
- sampling the video using the increased window according to the determined number of frames to obtain a sequence of increased images;
- acquiring an adjusted sequence of sampled images corresponding to the adjusted sampling window from the current sequence of sampled images; and
- using the adjusted sequence of sampled images and the sequence of increased images as a new sequence of sampled images obtained based on the adjusted sampling window.

7. The video sampling method of claim 1, further comprising:
- when it cannot be determined whether the action is finished according to the action parameters, calculating a subtraction value of the sampling window according to the action parameters; and
- determining the shifted position according to the subtraction value of the sampling window.

8. The video sampling method of claim 7, wherein the determining of the shifted position comprises:
- subtracting a window having a length based on the subtraction value from two ends of the sampling window, to obtain a first sampling window and a second sampling window;
- using one of the first sampling window and the second sampling window as an updated sampling window; and
- determining the shifted position according to the updated sampling window.

9. The video sampling method of claim 8, wherein the using of the one of the first sampling window and the second sampling window comprises:
- sampling a first sequence from the first sampling window and a second sequence the second sampling window, wherein each of the first sequence and the second sequence include a preset number of frames of sampled images;
- performing feature extraction and performing feature recognition on the first sequence and the second sequence; and
- selecting one of the first sampling window and the second sampling window as the updated sampling window according to a result of the feature recognition.

10. The video sampling method of claim 1, wherein the shifted position of the sampling window corresponds to a starting point of the sampling window.

11. A video sampling apparatus, comprising:
- a memory; and
- at least one processor coupled to the memory and configured to:
  - sample a video based on a sampling window to obtain a current sequence of sampled images;
  - acquire action parameters corresponding to the current sequence of sampled images, wherein the action parameters comprise a probability that an action is contained in the current sequence of sampled images, and a completeness degree which indicates a completeness of the action contained in the current sequence of sampled images;
  - select a candidate action having a highest probability from among candidate actions included in the current sequence of sampled images sequence as the action;
  - determine whether the action is finished and whether the current sequence of sampled images contains the action based on a comparison between the probability and at least one first threshold, and a comparison between the completeness degree and at least one second threshold;
  - based on determining that the action is not finished, calculate an incremental size of the sampling window according to the action parameters;
  - perform smoothing processing on the incremental size according to historical adjustment information of the sampling window;
  - determine a shifted position of the sampling window according to the incremental size;
  - adjust the sampling window based on the-shifted position; and
  - sample the video based on the adjusted sampling window.

* * * * *